United States Patent [19]

Anderson et al.

[11] Patent Number: 4,671,552
[45] Date of Patent: Jun. 9, 1987

[54] GRILL GUARD FOR VEHICLE FRONT END

[75] Inventors: James E. Anderson; Samuel R. Carlin, both of Sturgis, Mich.

[73] Assignee: Owens Products, Inc., Sturgis, Mich.

[21] Appl. No.: 829,727

[22] Filed: Feb. 14, 1986

[51] Int. Cl.[4] .............................................. B60R 19/02
[52] U.S. Cl. .................................. 293/144; 403/260; 403/258
[58] Field of Search ....................... 293/144, 143, 142; 403/260, 264, 258, 230, 233, 234, 237, 190, 191

[56] References Cited

U.S. PATENT DOCUMENTS

| 3,000,047 | 9/1961 | Hill | 403/258 |
| 4,013,372 | 3/1977 | Lay et al. | 403/258 |
| 4,083,641 | 4/1978 | Sado | 403/258 |
| 4,270,872 | 6/1981 | Kiyosawa | 403/258 |
| 4,469,360 | 9/1984 | Drury | 293/144 |

Primary Examiner—Robert R. Song
Attorney, Agent, or Firm—Flynn, Thiel, Boutell & Tanis

[57] ABSTRACT

A grill guard for a vehicle front end comprises a pair of upstanding end plates configured to extend forward and upward from a vehicle front bumper, and a cross tube extending laterally between the end plates. A one-way push-in screw retainer frictionally interlocks with the inner wall of the tube to resist removal therefrom. Disclosed are molded peripherally flanged end plates, with end plates, cross tubes and mounting brackets of molded plastics material. The cross tubes are shaped to incorporate lamp units. Headlight guards are mountable on the end brackets.

10 Claims, 11 Drawing Figures

FIG. 10

GRILL GUARD FOR VEHICLE FRONT END

FIELD OF THE INVENTION

This invention relates to a decorative accessory for vehicles and particularly to a decorative front end grill guard for vans, pickup trucks and four wheel drive (4×4) vehicles, including compact vehicles of that type.

BACKGROUND OF THE INVENTION

It is known to mount a so-called grill guard on the front end of a vehicle and same have been marketed for light truck-type vehicles such as above mentioned. Known grill guards of which we are aware have been of welded steel construction, usually chrome plated to provide an attractive finish surface. Same have generally been very sturdy and, at least initially, were intended to physically protect the front end of off-road recreational vehicles, such as four wheel drive trucks, from damage by brush, small saplings and the like encountered in off-road travel. Some known grill guards have extensions covering the area near the vehicle headlights for similar protective purposes.

A typical known grill guard has comprised a pair of vertical end plates arranged in parallel fore-aft planes and located on opposite sides of the vehicle grill, such end plates being connected by one or more, typically two, transverse tubes, and being mounted by suitable brackets on the front bumper of the vehicle. In some instances, the transverse tubes have been welded to the end plates, with the resultant assembly being thereafter chrome plated. However, the resultant product is bulky and hence cumbersome and unnecessarily expensive to ship from manufacturer through the distribution chain to the retailer.

Accordingly, it has been known to weld cross pieces in the ends of the tube, to thread such cross pieces, and to ship the grill guard in a knocked-down form (tubes disassembled from end plates) for more compact and hence inexpensive shipping to the retailer. The retailer or ultimate user can then assemble the end plates to the cross tubes by means of screws passed through holes in the end plates and threadedly engaging the welded cross pieces in the ends of the tubes.

Such grill guards have become popular as an add-on, after market accessory even for light truck vehicles which the owner does not intend to drive off-road or have encounter brush that might damage the vehicle front end. More particularly, grill guards of this type have become popular simply as a decorative add-on accessory for light truck vehicles, including two-wheel drive pickup trucks and vans not adapted for off-road travel.

However, such prior steel grill guards are relatively heavy. A heavy grill guard whose weight is centered at or somewhat in front of the front bumper of the vehicle tends to add its weight to the front wheels and indeed to somewhat reduce weight on the rear wheels of the vehicle. In the case of a front engine rear drive vehicle, particularly one such as a typical unloaded pickup truck, where the major mass (driver compartment and engine compartment) are nearer the front wheels than the rear, weight on the driving wheels is less than might be desired anyway and anything that reduces further, rather than adds to, the weight on the driving wheels, particularly under conditions of poor traction (such as snow and ice) is undesirable.

Further, such prior steel grill guards tend to be relatively expensive as to material cost, in view of the steel required, and in manufacture and labor, due for example the need for welding. Further, if the finish coating, such as chrome plate, is not carefully applied, or becomes damaged in use, a steel device exposed on the exterior of an automobile will be subject to unsightly rust which will impair the appearance thereof.

Accordingly, the objects and purposes of this invention include provision of an improved grill guard apparatus for use on light truck-type vehicles, such as pickup trucks, vans and four-wheel drive vehicles, including so-called compact vehicles of that kind, wherein such apparatus may be made very substantially lighter in weight (perhaps one-third the weight) and substantially lower in cost (perhaps one-third the cost) of a comparable steel unit and yet may be provided with an appearance at least as decorative as a corresponding plated steel grill guard, wherein such inventive apparatus includes end plates which may be molded with reinforcing portions, wherein the inventive apparatus is adaptable to mounting on the front end of several different makes of vehicles, wherein such apparatus may be shipped in a knocked-down condition to a retailer or point of use and easily assembled at that point merely by simple tools without any need for welding or the like, wherein such apparatus is readily arranged to incorporate driving or fog lights with minimal additional structure and maximum incorporation of the light structure into the grill guard structure and consequent enhanced appearance, wherein the apparatus may include headlight guards, and hide at least one headlight guard connection to the grill guard, and wherein the apparatus is capable of being made of a material which may be plated but will not rust in nonplated areas.

Further objects and purposes of the invention will be apparent to persons familiar with apparatus of this general type upon reading the following description and inspecting the accompanying drawings.

SUMMARY OF THE INVENTION

A grill guard for a vehicle front end comprises a pair of upstanding end plates configured to extend forward and upward from a vehicle front bumper, and a cross tube extending laterally between the end plates. A one-way push-in screw retainer frictionally interlocks with the inner wall of the tube to resist removal therefrom. A screw engageable with said screw retainer and end plate is tightenable to fix the end plate tightly against the adjacent end of said tube. The end plates mount the apparatus on a vehicle front bumper.

DETAILED DESCRIPTION

Figure 1:
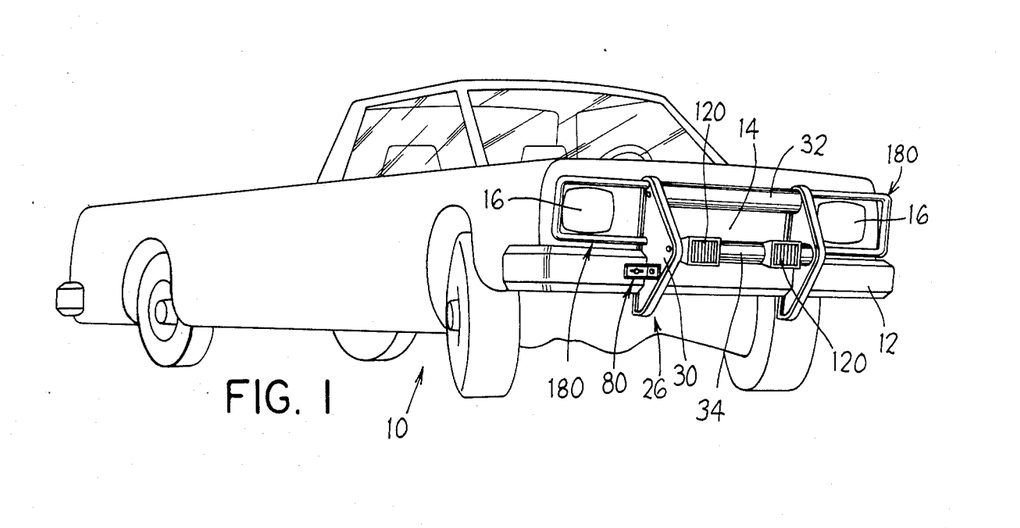
FIG. 1 is a pictorial view of a trucklike vehicle equipped with apparatus embodying the invention.

FIG. 1 discloses a conventional trucklike vehicle 10 having a laterally extending front bumper 12, a grill 14 behind and extending above the bumper 12, the grill being flanked by headlight units 16. Fixed to the bumper 12 and protruding upward, forward and somewhat below the bumper 12 is apparatus 26 embodying the invention.

Figure 2:
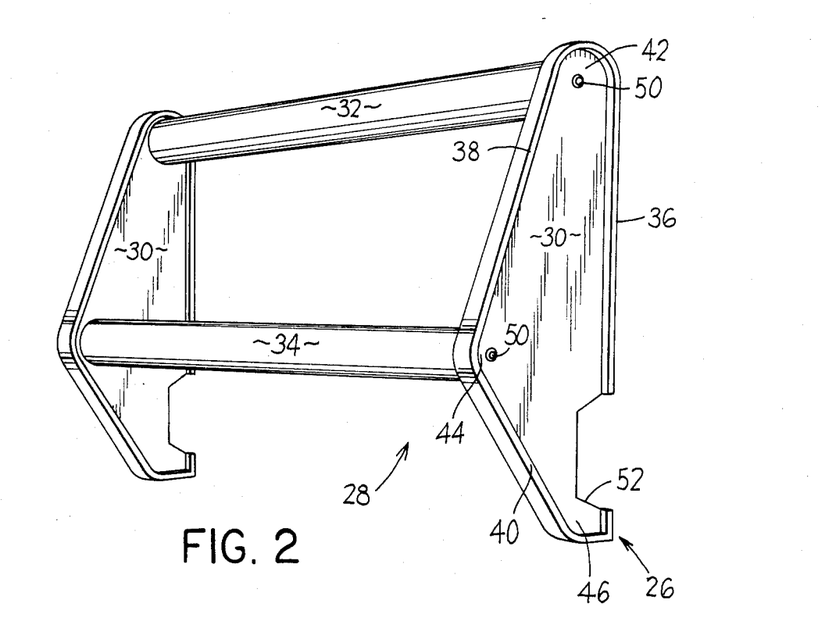
FIG. 2 is an enlarged pictorial view of the grill guard of FIG. 1.

The apparatus 26 includes a grill guard 28 comprising substantially vertical end plates 30 fixed in spaced parallel relation by upper and lower horizontal tubes 32 and 34 respectively. The end plates 30 are, as seen in FIG. 2, of approximately triangular shape having a substantially upstanding rear edge 36 from the upper and lower ends of which extend acutely forwardly angled upper and lower front edges 38 and 40, the edges 36, 38 and 40 meeting at upper, front and lower apices 42, 44 and 46. Screws (e.g., machine screws or bolts) 50, extending through the respective end plates 30 adjacent the top and front apices 42 and 44, fix the end plates to the adjacent ends of the tubes 32 and 34. Thus, the upper tube 32 fixedly extends between the upper apices 42 of the plates 30 and the lower tube 34 extends fixedly between the front apices 44 of the end plates 30. The lower portion of the rear edge 36 of each end plate 30 is preferably recessed, as indicated at 52 in FIG. 2, to accommodate the front face of the vehicle bumper 12. Accordingly, when installed on the vehicle, the bars 32 and 34 extend horizontally across the front central portion of the truck and the end plates 30 lie substantially in a vertical, fore-aft plane.

To the extent above described, the apparatus of FIGS. 1 and 2 is conventional.

Figures 4, 5:
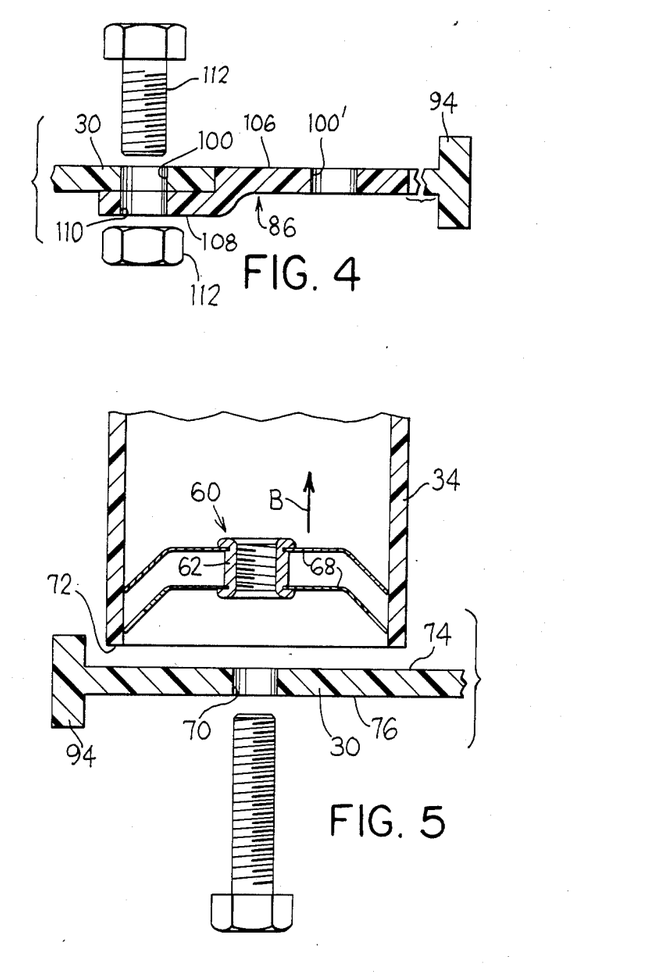
FIG. 4 is a fragmentary enlarged cross-sectional view taken on the line IV–IV of FIG. 3.
FIG. 5 is an enlarged, exploded, fragmentary cross-sectional view substantially taken on the line V—V of FIG. 3.
Figure 6:
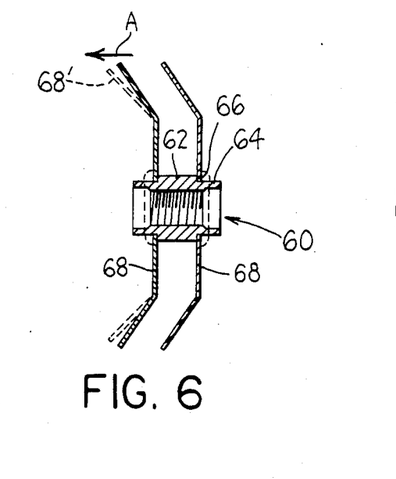
FIG. 6 is an enlarged fragment of FIG. 5 showing the screw retainers thereof in a partially assembled condition.
Figure 6A:
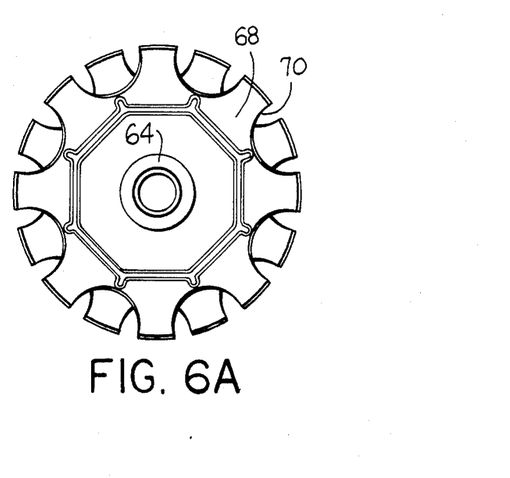
FIG. 6A is an axial end view of the screw retainer of FIG. 6.

Turning now more particularly to aspects of the FIG. 1 and 2 apparatus embodying the present invention, attention is directed to FIGS. 5 and 6 showing preferred structure for fixing the ends of the tubes 32, 34 rigidly to the adjacent end plate 30. A screw retainer 60 comprises an internally threaded tubular core 62 having ends 64 of reduced outside diameter each defining an axially facing step 66 which is radially outwardly swaged, during manufacture of the screw retainer 60, to fixedly secure to respective ends of the tube 62 an axially spaced pair of dished cross section, one-way tube gripping members 68. The tube 62 and gripping members 68 are preferably of metal. The tube 62 may be of aluminum or steel. The gripping members 68 are preferably of relatively thin, springy steel so as to be able to flex in the direction of the arrow A in FIG. 6, an exaggerated flexed position of the gripping member 68 being shown in dotted line at 68'. Flexing in the direction of the arrow A reduces the effective outside diameter of the gripping member 68. The gripping member 68, because of its dished or somewhat shallow conical shape, if flexed in an axial direction opposite that of the arrow A, would tend to enlarge its outside diameter. To enhance the axial flexibility of the tube gripping member 68, the peripheral portion thereof is provided with a plurality of circumferentially spaced recesses 70, giving the periphery of the member 68 a toothed appearance. Both gripping members 68 of a given screw retainer 60 are dished in the same axial direction, that is, are concave leftwardly in FIG. 6.

In use, each screw retainer 60 is axially forced into the open end of one of the tubes 32, 34 in the direction of the arrow B in FIG. 5, with the concave faces of the dished members 68 trailing (facing the open end of the tube and hence to the left in FIG. 5). Such insertion causes the outer peripheral portion of each gripping member 68 to interfere with the interior surface of the corresponding tube 32, 34 and so the outer peripheral portion of the gripping member 68 flexes in a trailing direction (the direction A in FIG. 6) so as to reduce the effective outside diameter of the dished gripping member 68 enough to permit its entry into the corresponding tube 32, 34. Thus, the screw retainer 60 can be forcibly pushed into the end of the corresponding tube 32, 34 so that both of its members 68 are entirely contained within the tube and such that the outermost (leftward in FIG. 5) member 68 is spaced inward a short distance (for example ⅛ to ¼ inch) from the open end of the tube. Once inserted into the tube, a given gripping member 68 cannot be pulled out of the same end of the tube, due to friction and the tendency for the relatively sharp edged, square cross section peripheral edge of each member 68 to dig into the material of the tube 32 and bend to enlarge the outside diameter thereof, and hence cause same to interlock still more strongly with the material of the interior sidewall of the tube. Hence, the harder one tries to force the screw retainer 60 leftwardly out the open end of the tube, the greater the resistance of the gripping members 68 against such movement.

Since the screw retainers 60 must be forcibly pressed into the ends of the tubes, such is preferably done by the manufacturer of the grill guard apparatus. However, the manufacturer may ship the tubes 32 and 34 and end plates 30 detached from each other and hence compactly packaged in a flat, compact shipping container at minimal cost. The retailer or user can then readily assemble the end plates 30 to the tubes 32 and 34 as follows. As seen in FIG. 5, the end of each tube 32, 34 containing its upper retainer 60 is brought against the inner face of the corresponding end plate 30 in coaxial alignment with a mounting hole 70 in the end plate 30. A corresponding screw (for example an Allen screw) is snugly but slidably inserted through the hole 70 to threadedly engage the internally threaded tube 62. Tightening the screw 50 thus pulls the end plate 30 snugly against the end of the corresponding tube 32, 34, the rigidity of the tube 32, 34 against the end plate 30 being enhanced by contact between the diametral end plane 72 of the tube and the opposed face 74 of the end plate 30, as well as by tightening of the head of the screw 50 against the outer face 76. The apparatus of FIGS. 5 and 6 provides a female thread in the end of the tube 32, 34 in a quick and easy manner, merely by axial push insertion of the retainer 60, and the screw retainer 60 can be placed in the end of the tube as the last step in manufacture of the tube, even after the tube has had its exterior surface plated (e.g., chrome plated) without any danger of marring the exterior surface of the tube, all in contrast to prior screw retainers which are welded to a tube. However, the screw retainer 60 may be installed, as shown in FIG. 5, in tubes of a wide variety of materials, for example both steel tubes and tubes of plastics materials.

In the preferred embodiment shown, the end plates 30 and tubes 32, 34 are of rigid plastics material, such as ABS. A special angle bracket 80 (FIGS. 9 and 10) is secured to each end plate 30 at the lower, rear edge portion thereof, by a nut and bolt unit 82 passing through one flange of the angle bracket and through the lower edge portion of the end plate 30 (or an adapter 86 hereafter discussed with respect to FIG. 4). The other flange of the angle bracket 80 is provided with a horizontally elongate slot 88 for securement, by an existing bumper bolt of the vehicle bumper 12, to such bumper 12. For greater strength, the angle bracket is provided with upper and lower webs 90 extending between the flanges 92 of the angle bracket.

When constructed of rigid plastics material, such as ABS, the end plates 30 are provided with an integrally molded edge flange 94 (FIGS. 3 and 4) extending around the major portion of the periphery of the end plate 30 in a continuous manner except for the portion of the end plate adjacent the bumper, namely the lower rear portion thereof. The edge flange 94 provides the peripheral portion of the end plate 30 with a substantially T cross section as seen in FIG. 4 and thereby reinforces the peripheral edge of the end plate 30 to protect it against minor impact damage.

Figure 3:
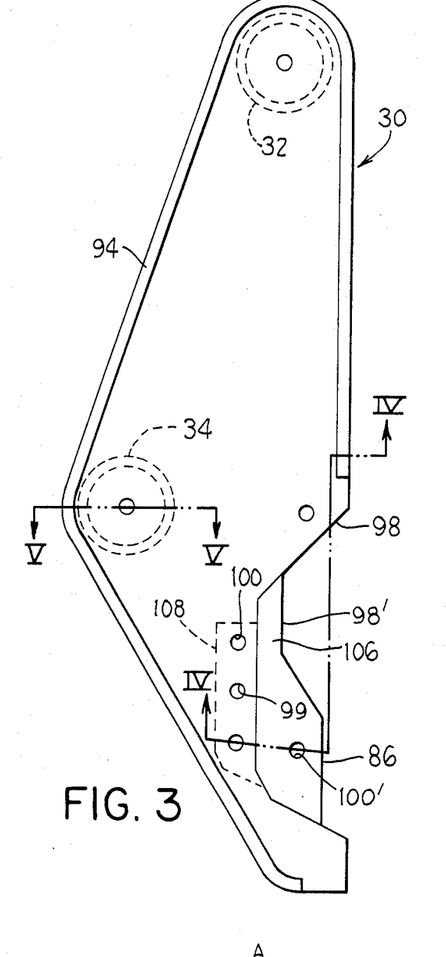
FIG. 3 is an enlarged side elevational view of an end plate, provided with an adapter plate, of the FIG. 1 apparatus.
Figure 9:
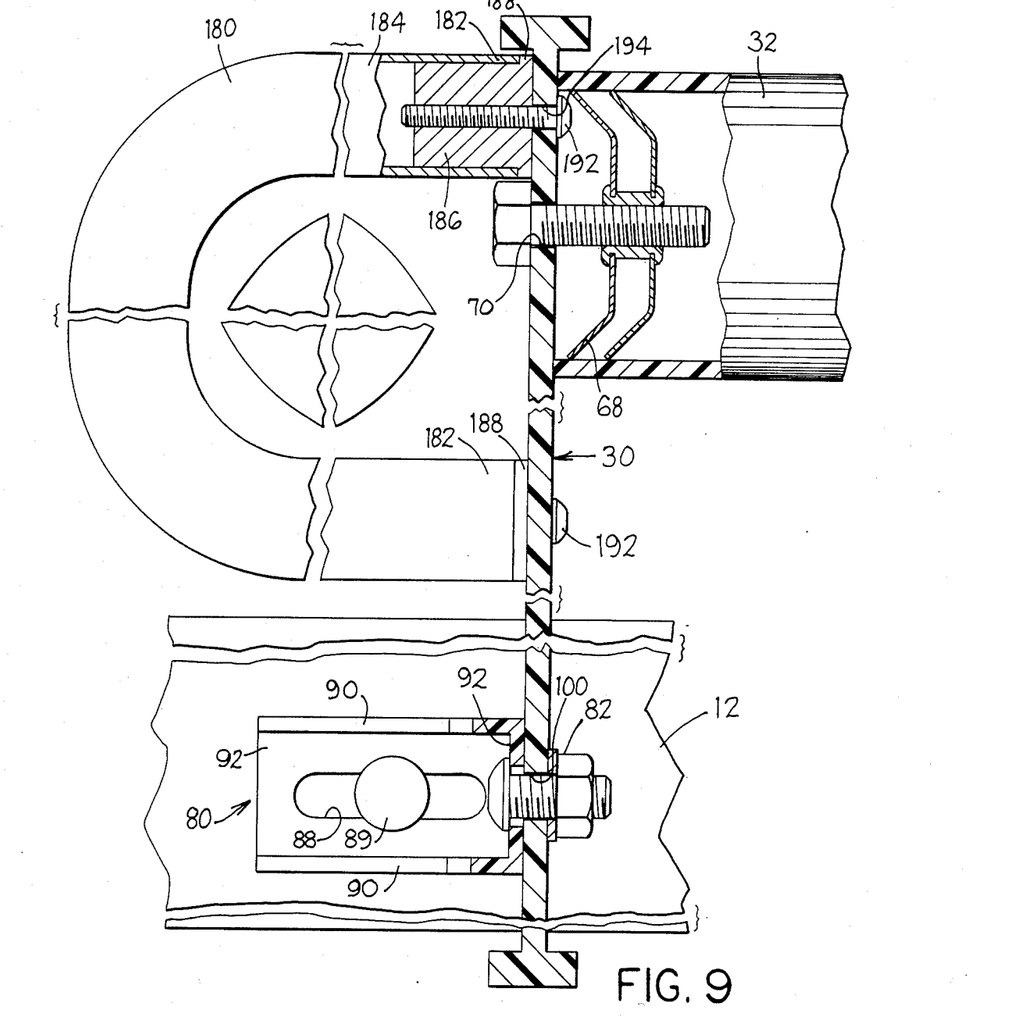
FIG. 9 is an enlarged fragmentary partially broken front elevational view of the leftward portion of the apparatus of FIG. 1 showing the connection of a headlight guard to an end plate of the grill guard apparatus.
Figure 10:
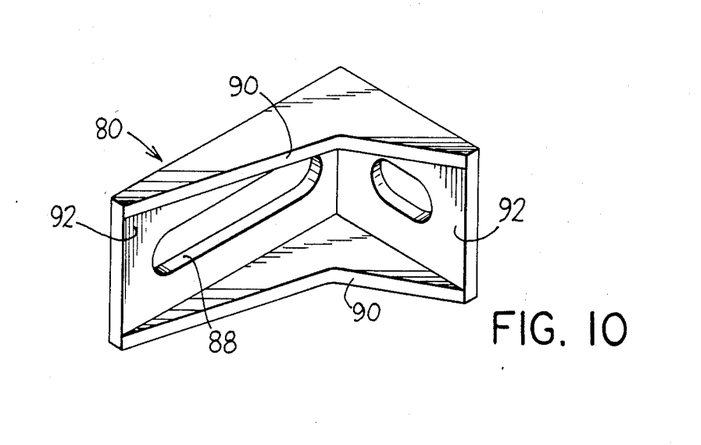
FIG. 10 is a sectional view of a mounting bracket of FIG. 9.

It is desirable to be able to mount the end plates 30, and hence the apparatus 26, on different brands and models of trucks, without having to reshape the rear edge of the end plates 30 or modify the bumper or other front end components of the truck. A recess 98 is provided in the lower rear edge portion of each end plate 30 for receiving forwardly thereinto the front bumper 12 of a truck. Different trucks makes and models will require a different depth and height of recess. To fit several different trucks, the recess 98 is given the maximum height and fore-aft depth needed to fit the most demanding of the several trucks with which it is to be used. At least one bolt hole 99 is provided adjacent the inner (forward) edge of the recess 98 for receiving the nut and bolt unit 82 (FIG. 9). To enable the end plate 30 to be mounted on truck bumpers requiring a less deep end or high recess 98, differently configured adapters may be provided, one of which is shown by way of example to be the adapter 86 above mentioned (FIGS. 3 and 4). The adapter 86 has a rear portion 106 adapted to lie in coplanar relation with the end plate 30 and a forward portion 108 offset sidewardly from the rearward portion 106 by the thickness of the central portion of the end plate 30. Holes 110 (FIG. 4) in the forward portion 108 align with the holes 100 drilled in the end plate 30 for receiving nut and bolt units 112 for rigidly securing the adapter 86 in the recess 98 of the end plate 30 as seen in FIGS. 3 and 4. The rear portion 106 conforms in shape, seen in elevation as in FIG. 3, to the recess 98 so as to lie in snug edge contact therewith when the nut and bolt units 112 are tightened. The rear portion 106 of the adapter 86 thus acts as a coplanar rear extension of the recess 98 and with a portion of the recess 98 defines a new, shallower and differently shaped recess 98' to better fit the bumper of another vehicle.

It will be apparent that by using adapters having a different rear edge configuration, modified recesses 98' of different shapes can be achieved and thus a satisfactory fit to a variety of vehicle front ends can be achieved without modification of the end plates 30.

Where the grill guard 28 is to be used for decorative purposes, rather than to protect the vehicle grill from impacts from brush (normally when the grill guard is of plastics material though, if desired, same may be of metal), then a convenient option involves providing the front face of one of the tubes 32, 34, here the lower tube 34, with one or preferably a pair of symmetrically located lamp units 120. Each lamp unit 120 involves a lamp housing 122 of boxlike configuration having end walls 124, a top wall 126 and a bottom wall 128. The lamp housing 122 is open to the rear and the rear edges 130 of the sidewalls 124 are semicircularly recessed to conform to the outside diameter of the tube 34, such that the lamp housing 122 can be snugly fitted to the front face of the tube 34 and fixedly secured there by any convenient means, such as adhesive bonding or screws as hereafter discussed. The front wall of the tube 34 is provided with an opening 132 sized somewhat smaller than the lamp housing 122 so as to be hidden thereby when the lamp housing 122 is secured to the front face of the tube 34. The front of the lamp housing 122 is open. The front edges of the walls 124, 126, and 128 are stepped at the interior portion thereof as indicated at 134 (FIG. 8) to receive and support the front peripheral flange 138 of a conventional lamp 140 against rearward movement with respect to the lamp housing 122. The open interior 142 of the housing 122 provides room for the rearwardly protruding body 146 of the lamp 140. Clips 150 of generally L cross section have front flanges 152 which overlap the front peripheral flange 138 of the lamp 140. Each clip 150 also has a rearwardly extending body 154 which abuts the front edge of the lamp housing 122 immediately outboard of the step 134 and through which extends a holding screw 156 which is threaded into a hole 160 in the front edge of the lamp housing 122, again outboard of the step 134. A pair of such clips 150 are provided one on either side of the lamp 140 for securely holding the front peripheral flange 138 of the lamp 140 against the perimetral step 134 of the lamp housing. In this way, the lamp 140 is removably fixed in the housing 122 to shine forwardly.

Figure 7:
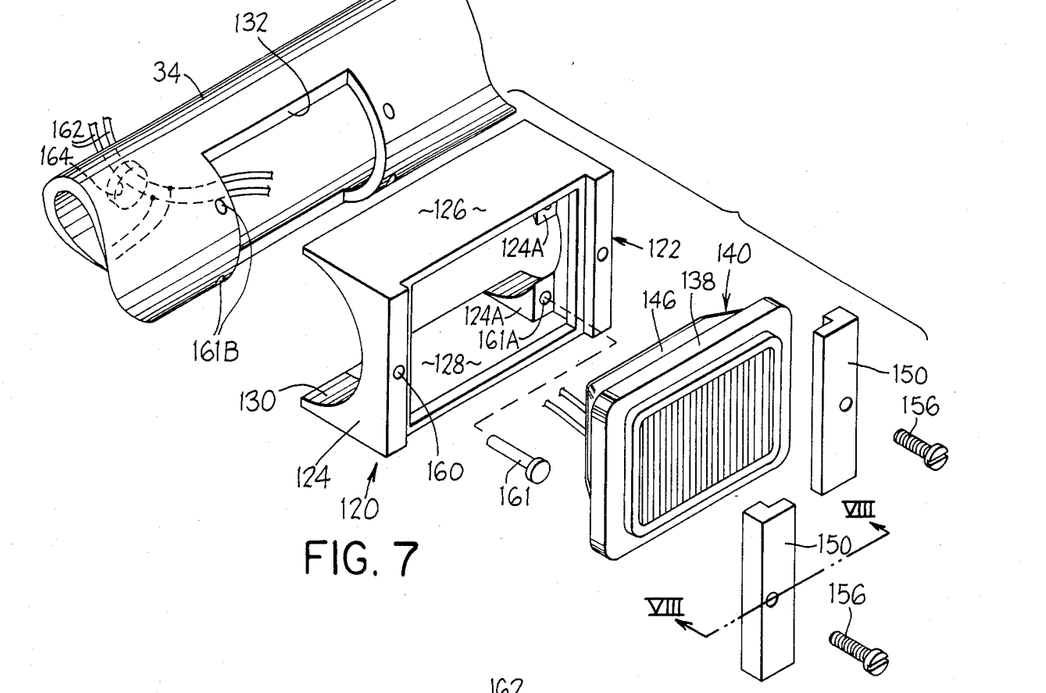
FIG. 7 is an enlarged exploded fragmentary view of the apparatus of FIGS. 1 and 2 showing a modification, namely incorporation of a lamp mounting into one cross tube of the apparatus.
Figure 8:
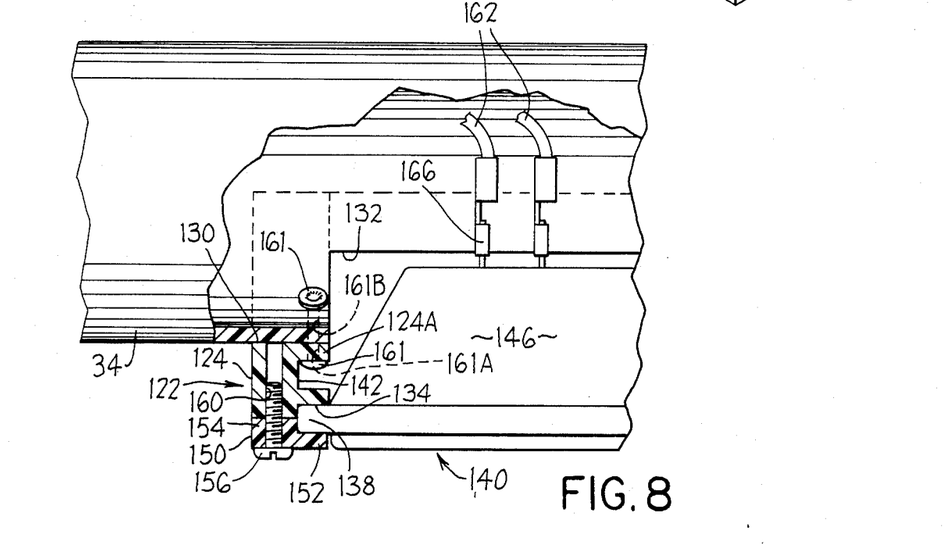
FIG. 8 is an enlarged fragmentary cross-sectional view substantially taken on the line VIII—VIII of FIG. 7.

In the examples seen in FIGS. 7 and 8, four fasteners, e.g., rivets, 161 extend through corresponding holes 161A in bosses 124A on the inboard side of the end walls 124 of the housing 122 and coaxial holes 161B in the tube 34 to tightly fix the housing 122 to the tube 34. Conveniently, the holes 161A are located near the corners of the housing 122 so as not to interfere with the screw holes 160 therein. Tightening the screws 156 firmly but removably fixes the clips 150 and lamp 140 to the housing 122 and cross tube 34. Thus, in case of damage to the clips 150 or lamp 140 after a period of use, the lamp unit 120 can be taken apart by loosening the screws 156 and the damaged part can be replaced without need to replace the cross tube 34.

Insulated electrical conductors 162 conventionally connect, as by suitable clips 166 (FIG. 8), to the terminals at the rear of the lamp 140, which electric conductors 162 are led through the opening 132 into the cross tube 34 and thence may be led from the tube 34 along its rear face through a hole indicated in broken line at 164 in FIG. 7, to a conventional driving or fog lamp switched battery circuit in the automobile.

It is contemplated that relatively high powered lamps 140 can be used, for example, a 55 watt driving lamp. Accordingly, the lamp housing 122 and clips 150 preferably are of a temperature resistant plastics material, such as nylon.

It is known to laterally cantilever from the outer faces of the end plates of a grill guard a further accessory, namely so-called head light guards. These are conventionally constructed of a U-shaped piece of metal tubing (of diameter typically of about one inch outside diameter and hence considerably smaller diameter than the cross tubes 32, 24). Such a headlight guard is seen at 180 in FIGS. 1 and 9. The U-shaped headlight guard 180 normally opens toward the adjacent end plate and has its free ends fixed thereto in vertically aligned relation, adjacent the top of the end plate and at a point adjacent the middle thereof. Conventionally, such a headlight guard is secured to a metal end plate by welding or other suitable means.

In the present embodiment, however, we have found that the ends 182 of the U-shaped tube 184 defining the headlight guard 180 may be provided with press fitted metal plugs 186 whose outer ends are flanged at 188 to provide a generally T-shaped cross section, the flange 88 being forced against the end 182 of the tube 184 as the plug 186 is press fitted into the end of the tube. The plug 186 has a threaded coaxial central opening for threadedly receiving a screw 192, as seen in FIG. 9. By axially sliding the screw 192 through a hole 194 in the end plate 30, and threading such screw into the threaded central opening of the plug 186, the adjacent end 182 of the headlight guard tube 184 can be fixed to the outboard face of the end plate 30. Both free ends 182 of the U-shaped headlight guard tube are so fixed to the outboard face of the end plate 30 cantilever the headlight guard accessory from the upper portion of the corresponding end plate 30. To minimize contact pressure on the inboard face of the end plate 30, the screws 192 may be wide headed screws, such as wide headed Allen screws. It will be seen that this mounting arrangement for a headlight guard 180 is most rigid and hence is preferred, with end plates 30 of metal, though shown in FIG. 9 as being of rigid plastics material.

In the particular embodiment shown in FIG. 9, the upper end 182 of the headlight guard tube 184 is so located that the head of its screw 192 is housed within the end of the adjacent upper cross tube 32, namely by locating the hole 194 at less than the inside radius of the cross tube 32 from the centerline of the tube mounting bolt hole 70 in the end plate 30. Such is permitted by the dish-shape of the two gripping members 68 and the fact that the outboard one thereof is spaced somewhat from the free end of the tube 32, leaving space for the head of the screw 192. By appropriate sizing of the headlight guard 180 and by making same coplanar with the plane defined by the cross tubes 32 and 34, it is contemplated that the mounting screw 192 for both ends of the headlight guard 180 might similarly be located in and thus hidden by the ends of the cross tubes 32 and 34 respectively. However, in the present embodiment, the head for the mounting screw 192 for only one end of the headlight guard accessory tube 184 is so hidden. The operation of the apparatus will be apparent from the foregoing description. However, same will be briefly summarized for convenience below.

The apparatus is economically shipped in a flat, knocked-down condition to a retailer or point of use and is there quickly and easily assembled by first mounting the headlight guard accessories 180 (if present) to the outboard faces of the end plates 30 by means of the screws 192. Thereafter, the end plates are fixed to the adjacent ends of the cross tubes 32 and 34 by means of the screws 50, which threadedly engage the screw retainers 60 previously inserted into the ends of the tubes 32 and 34 preferably at the point of manufacture. If required by the bumper configuration of the vehicle, a suitable adapter 86 is installed in the recess 98 by the nut and bolt units 112. An angle bracket 80 is then fixed to each end plate 30 (or the adapter 86 thereon if present) by a nut and bolt unit 82. Then an existing vehicle bumper bolt 89 is removed forwardly from the bumper and then reinserted rearwardly through the slot 88 in the corresponding angle bracket 80 and the existing hole (not shown) in the bumper 12 to threadedly engage the conventional vehicle bumper mounting structure (not shown). The lateral width of the slot 88 permits lateral adjustment of the location of the corresponding end plate 30 to permit the end plates 30 to remain at the spacing defined by the length of the cross tubes 32 and 34 and to permit centering of the grill guard 28 on the vehicle bumper 12. Tightening of the bumper bolts 89 then secures the angle brackets 80 and hence the grill guard 28 to the vehicle bumper. If present, the headlight guards 180 will thus be located so that the headlight is generally centrally located with respect to the corresponding headlight guard 180 and so that road illumination by the headlights is unimpeded by the presence of the headlight guard 180.

If a lamp unit or units 120 is provided with the grill guard 28, the lamp unit 120 will normally be preassembled at the point of manufacture and hence will not require attention during installation of the grill guard 128 on the vehicle, except to provide a connection to a switched source of vehicle battery power for the electric conductors 162 so as to permit switching on and off of the lamps 140.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive proper or privilege is claimed are defined as follows:

1. A grill guard for a vehicle front end, comprising:
   a pair of upstanding end plates configured to extend forward and upward from a vehicle front bumper, and a cross tube extending laterally between the end plates;
   a one-way push-in screw retainer frictionally interlocked with the inner wall of said tube to resist removal therefrom, in response to a force tending to pull said screw retainer out through the adjacent open end of the tube;
   screw means engageable with said screw retainer and end plate and tightenable for pulling said end plate tightly against the adjacent end of said tube, in which said screw retainer has an internally threaded core and a tube engaging portion extending radially out from said core to peripherally engage the inner wall of said tube, said tube engaging portion being dished in a direction to be concave toward the open end of said tube, said tube engaging portion being relatively stiff but elastically deformable radially inward to permit said screw retainer to be pushed into the open end of the tube, the dished shape of said tube engaging portion being responsive to a force thereon tending to push same out of the tube by tending to expand into tighter engaging contact with the interior surface of said tube, said periphery of said tube engaging portion having edge means for tending to dig into the interior surface of said tube in response to a force tending to pull said screw retainer out through the adjacent open end of the tube, said screw retainer comprising a pair of said dished tube engaging portions, said tube engaging portions being dished in the same direction, namely toward the open end of the tube, and being axially spaced at opposite ends of said core, the said peripheral edge means comprising plural circumferentially spaced recesses spacing toothlike portions of the peripheral edge of the dished tube engaging portion, such that the peripheral edge of said tube engaging means has a plurality of circumferentially spaced corners adapted to assist digging into the interior surface of said tube;

means for mounting said end plates on a vehicle front bumper.

2. The apparatus of claim 1 in which said end plates and tube are of plastics material.

3. The apparatus of claim 1 in which said end plates are of plastics material, said end plates being of substantially triangular shape and having a laterally widened edge flange extending along the end plate perimeter except adjacent the portion of the end plate to be mounted to the bumper of the vehicle, said edge flange giving the peripheral portion of said end plate a generally T-shaped cross section.

4. A grill guard for a vehicle front end comprising:
a pair of upstanding end plates configured to extend forward and upward from a vehicle front bumper, and a cross tube extending laterally between the end plates;
means for holding said end plates tightly against the adjacent end of said tube;
means for mounting said end plates on a vehicle front bumper, in which said means for mounting includes an angle bracket having one leg slotted laterally to receive a bumper bolt therethrough for securing said leg to the front face of the vehicle bumper in a laterally adjustable manner, said angle bracket having a forward extending leg and fastening means for releasably fastening said forward extending leg to said end plate for mounting the latter on said bumper.

5. A grill guard for a vehicle front end comprising:
a pair of upstanding end plates configured to extend forward and upward from a vehicle front bumper, and a cross tube extending laterally between the end plates;
means for holding said end plates tightly against the adjacent end of said tube;
means for mounting said end plates on a vehicle front bumper, in which said means for mounting includes a recess in the lower portion of the rear edge of said end plate adapted to receive the front portion of a bumper therein, and including an adapter of generally Z-shaped cross section having a forward portion releasably fixable in overlapping relation with said end plate just ahead of said recess, said adapter having a rearward portion offset from said forward portion by the thickness of said end plate and thereby adapted to lie in coplanar relation with said end plate and extend rearwardly into said recess of said end plate to change the contour thereof and to make same more shallow so as to adapt the end plate to use on a bumper of different configuration then would fit said recess.

6. A grill guard for a vehicle front end comprising:
a pair of upstanding end plates configured to extend forward and upward from a vehicle front bumper, and a cross tube extending laterally between the end plates;
means for holding said end plates tightly against the adjacent end of said tube;
means for mounting said end plates on a vehicle front bumper;
an opening in the front face of said cross tube, a generally rectangular lamp housing secured to the front face of said cross tube at a location to cover said opening, said opening being smaller than the portion of said housing opposing said tube, said housing having an open forward end recess for receiving the rim of a conventional lamp, the remainder of said lamp extending into said housing, and means for securing said lamp and housing to the front of said cross tube.

7. The apparatus of claim 6 in which said securing means comprise screws extending through L cross section clips and end walls of said housing to threadedly engage the latter to thereby sandwich said lamp against said housing and fastening means fixing said housing against said cross tube.

8. The apparatus of claim 7 including means for securing electrical conductors to conventional terminals on the back of said lamp, said electrical conductors extending through said opening in front of said tube and passing part way through said tube to exit therefrom to a point of energization on said vehicle.

9. A grill guard for a vehicle front end comprising:
a pair of upstanding end plates configured to extend forward and upward from a vehicle front bumper, and a cross tube extending laterally between the end plates;
means for holding said end plates tightly against the adjacent end of said tube;
means for mounting said end plates on a vehicle front bumper;
a generally U-shaped, tubular headlight guard cantilevered laterally outboard from each end plate adjacent each vehicle headlight to provide a decorative frame therefor, plugs press fitted in the open ends of the headlight guard, said plugs closing the adjacent tube end, said plugs being internally threaded, screw means extending through the end plate and threadedly engaging the plug to secure the adjacent end of said tube to said end plate, in which the head of the screws securing one of said plugs to said end plate is located inside of the cross tube, said cross tube and headlight guard extending in opposite directions from opposite sides of said end plate.

10. A grill guard for a vehicle front end comprising:
a pair of upstanding end plates configured to extend forward and upward from a vehicle front bumper, and a cross tube extending laterally between the end plates said end plates being of plastics material, said end plates being of substantially triangular shape and having a laterally widened edge flange extending along the major part of the end plate perimeter;

a one-way push-in screw retainer frictionally interlocked with the inner wall of said tube to resist removal therefrom, in response to a force tending to pull said screw retainer out through the adjacent open end of the tube;

screw means engageable with said screw retainer and end plate and tightenable for pulling said end plate tightly against the adjacent end of said tube;

means for mounting said end plates on a vehicle front bumper, said means for mounting including a recess in the lower portion of the rear edge of said end plate adapted to receive the front portion of a bumper therein, and an adapter of generally Z-shaped cross section having a forward portion releasably fixable in overlapping relation with said end plate just ahead of said recess, said adapter having a rearward portion offset from said forward portion by the thickness of said end plate and thereby adapted to lie in coplanar relation with said end plate and extend rearwardly into said recess of said end plate to change the contour thereof and to make same more shallow so as to adapt the end plate to use on a bumper of different configuration than would fit said recess;

lamp housing secured to the front face of said cross tube and covering an opening in said crosstube, said housing having an open forward end recess for receiving the rim of a lamp, the remainder of said lamp extending into said housing, and means for securing said lamp and housing to the front of said cross tube.

* * * * *